Patented May 30, 1939

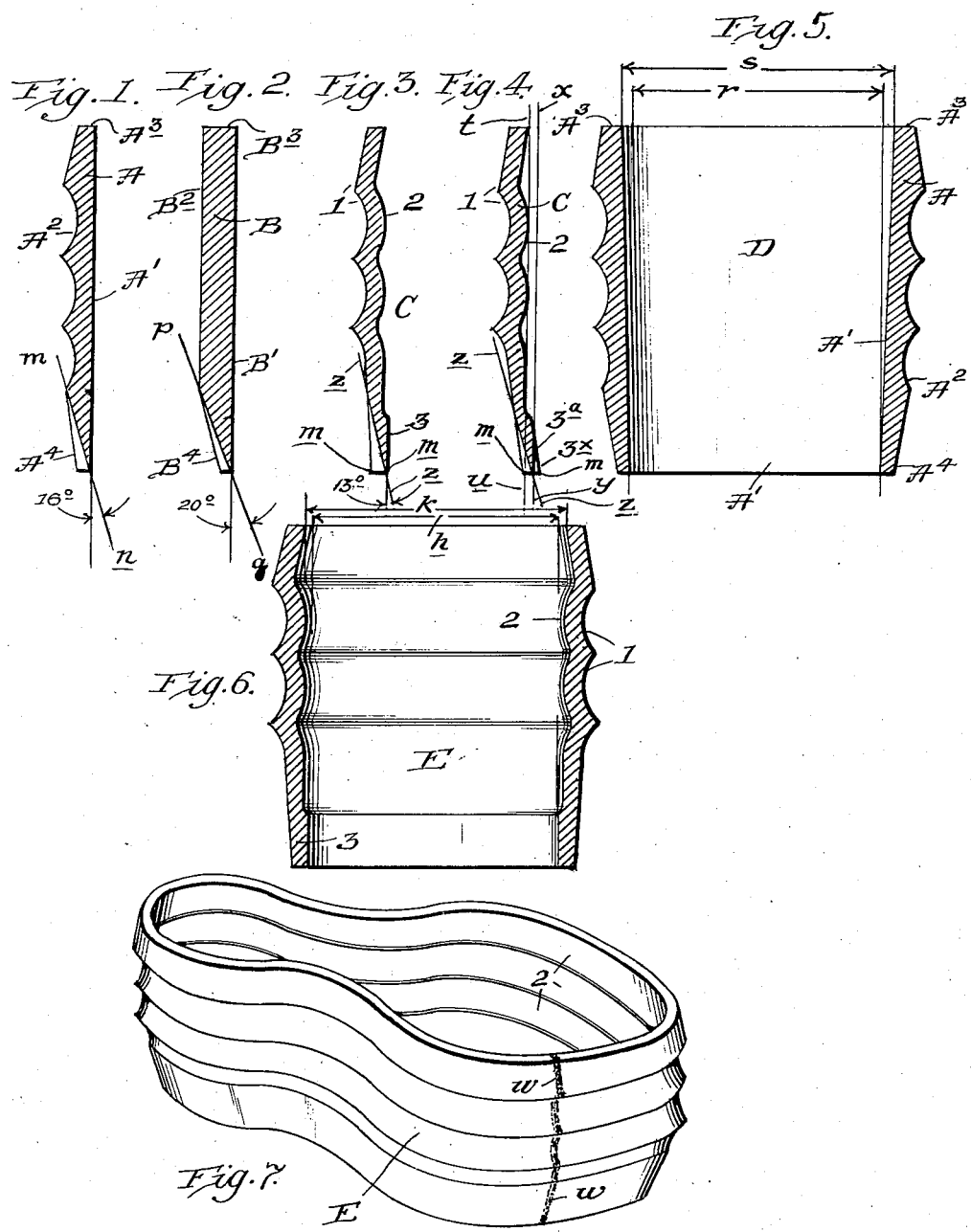

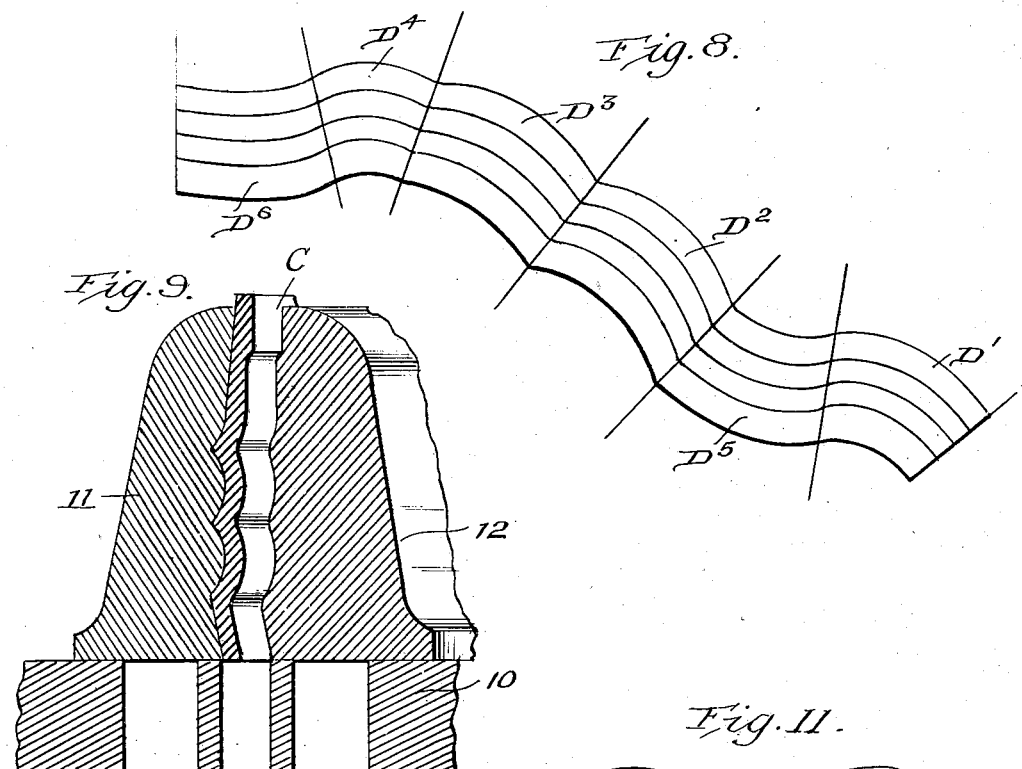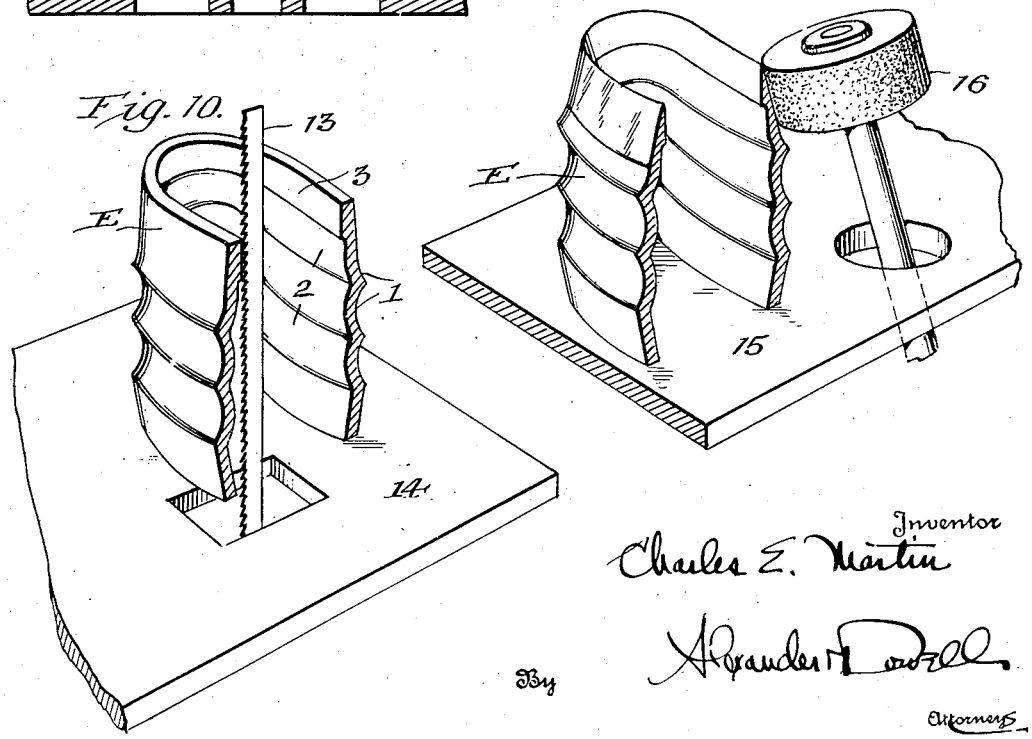

2,160,437

UNITED STATES PATENT OFFICE 2,160,437

DIE STOCK AND METHOD OF MAKING CUTTING DIES

Charles Earl Martin, Binghamton, N. Y., assignor to Endicott Johnson Corporation, Endicott, N. Y., a corporation of New York Application August 21, 1936, Serial No. 97,274

4 Claims. (Cl. 76—107)

This invention relates to sharp-edged cutting dies, and method of making same, and the principal object of the invention is to provide a ring die of the above type for use in cutting leather, fiber, canvas cloth, rubber, Celluloid, paper, or other materials used in the manufacture of shoes or shoe parts, or other articles of manufacture requiring parts to be cut to a pre-determined, exact size and shape; the die being formed of relatively thin corrugated rolled steel stock of particular design by merely bending the raw stock in one plane only on an ordinary bending bench, the stock itself providing the necessary clearance in the die so that the opening therethrough gradually increases from the lower or cutting edge to the upper or striking edge in order to permit the cut blanks to pass upwardly through the die for ready removal without binding when the die has been "cut full." Lack of sufficient clearance requires excessive cutting power, and also causes the die to "spring out," altering its original shape in such manner that successive cuts are not all of exactly same shape and size.

More particularly my die is designed for cutting sole leather or fiber in the form of soles, insoles, counters and box toe forms, and all such work as is ordinarily accomplished with dies formed from flat straight steel, ordinarily classed and known to the steel industry as flats, bands, single or double bevels, or corrugated section; or with dies made from stock generally known to the cutting die industry as Walker die stock, which has corrugations on its outer face for the purpose of providing a safe gripping surface for the hands of the operator using the die made therefrom, but which stock does not in itself provide clearance for the die made therefrom and therefore must be subjected to successive heatings and forgings, generally hand-forgings, this being the only method known when using such die stocks to produce the necessary clearance on the inside of the die.

Other objects of the invention are to provide a die stock which when formed into a die will save approximately 60% of the weight of ordinary dies made from the usual Walker die section or from ordinary flat or corrugated steel sections; also provide a section capable of being uniformly heat treated during the tempering operation of the finished die.

Other minor objects of the invention will be hereinafter set forth.

I will explain the invention with reference to the accompanying drawings which illustrate several practical embodiments thereof to enable others familiar with the art to adopt and use the same; and will summarize in the claims the essential features of the invention, and the novel features of construction, for which protection is desired.

In said drawings:

Fig. 1 is a cross-section through the usual Walker die stock, showing the corrugations on the exterior face.

Fig. 2 is a cross-section through ordinary flat die stock.

Fig. 3 is a cross-section through one form of my novel die stock.

Fig. 4 is a cross-section through a slightly modified form of my novel die stock.

Fig. 5 is a transverse section through a die formed of Walker die stock, indicating the hand-forged clearance.

Fig. 6 is a transverse section through a die formed of my novel die stock, illustrating the clearance inherent in the raw stock itself.

Fig. 7 is a perspective view of a sole die formed of my novel die stock.

Fig. 8 is a reduced expanded view of the sole cutting die shown in Fig. 7.

Fig. 9 is a section through a bending bench and tools used for bending my stock in one plane only, when forming dies therefrom.

Fig. 10 is a perspective view, partly in section, showing the method used for continuous filing of the inner face of the finish strip of a die formed of my novel die section.

Fig. 11 is a perspective view partly in section showing the method of grinding and dressing the outer face of the cutting edge of a die formed of my novel die section.

In the drawings, Fig. 1 illustrates a typical section of Walker die-stock A having a straight side A' forming the inner wall of the ring die D (Fig. 5), and having a corrugated face A2 forming the outer wall of said die D, the said corrugations providing a safe gripping surface for the hands of the operator. Fig. 2 illustrates a typical section of flat steel die stock B for making dies similar to those made of the Walker section, except that the outer face B2 is straight and is parallel with the inner face B'. The upper ends A3 and B3 respectively of the stocks A and B are flat and form the striking end of the die, while the lower portions are tapered downwardly and inwardly, as A4 and B4 respectively, from the outer face towards the inner, and are subsequently ground or filed along the lines m—n and p—q respectively, to form the cutting edge of the die.

In making ring dies from die stocks such as shown in Figs. 1 and 2, the usual practice is to furnish the die maker with a light gauge sheet metal template of exact shape and size of the required blank. The die maker measures the perimeter of the template and transfers such measurement to that edge of stock which will become the cutting edge of the die. On the opposite edge, i. e., that which will become the striking edge, a distance from one to one and one-half inches more than that of the cutting edge is measured off to allow the surplus material for the provision of the necessary clearance. The stock strip is then cut to said measurements, then heated and bent as nearly as possible to the approximate size and shape of the template. In the case of a sole die, the stock would be bent to the approximate form shown in Fig. 7; after which the abutting ends of the stock would be welded together as at $w$ in Fig. 7.

The welded die blank is then heated to proper temperature and, by hammer-blows usually over the horn and edges of an anvil, or over various special stakes, or by other mechanical means, brought to more nearly conform with the shape of the template, this operation requiring repeated heatings and forging during which the side walls and upper portion of the die would gradually be displaced or stretched and so deformed as to form a constantly widening and increasing opening within the die D from the cutting edge A4 to the striking edge A3, the provided clearance in the die D (Fig. 5) being denoted by the lines $r$ and $s$. This hammered-out or forged clearance is never definite as to amount, and the return of dies to be "cleared-out" when it is found after trial in actual service that some portions of the die binds, is a common experience to all die makers.

The usual sole cutting die, such as shown in Fig. 7, consists of a combination of six curves, shown in expanded relation in Fig. 8, the die having four convex surfaces D1, D2, D3, and D4 and two concave surfaces D5 and D6 at the instep portions; and obviously to produce these six curves in the proper relation to each other, while maintaining the die walls at the proper flare, and at the same time keeping the cutting and striking edges parallel to each other, is a job requiring long practice and a high degree of skill, and at best is slow and expensive. When it is considered that this complex shape (Fig. 8) of sole cutting die has been produced from a strip of straight flat steel (Fig. 2) or Walker die stock (Fig. 1), the amount of effort required and time consumed to complete the die will be readily appriated.

The cutting edge of the die D would then be surfaced or "raced-off" on a disc type of grinder. The raced-off face of the die would then be placed in contact with a magnetic chuck, and passed under a grinding wheel and ground down to proper height to bring the edge and back into parallel relation; and the raced-off edge would then be coated or covered with a copper sulphate solution which upon drying leaves a thin copper plated surface. The template would then be placed on the plated surface, and a line scribed around the template, and the surplus steel on the inside of the die filed away to said line for the purpose of making the die the exact size and shape of the template. After filing, the outer face of the die would be ground to nearly complete the cutting edge, and the die hardened, polished, and as a rule brought to final and complete cutting edge by use of hand files.

The foregoing operations described are standard and practiced by all die makers, and are typical of the complete construction of a die with the exception of the attachment of handles, lugs and such other items which have no bearing on the present case.

Manufactured sheet material, such as fabrics, leather board, and fiber board are uniform in thickness and structure and surface appearance, and a number of such sheets may be superimposed and cut at one time. The number of sheets which may be thus cut at one time is limited only by the construction and strength of the die and machine used. Clearance is required where a single thickness is cut at one time and retained within the die while succeeding cuts force the previous cuts into the chamber formed by the walls of the die, which method is commonly employed when cutting soles, insoles, counters, box toes, heel lifts, etc., from sole leather, and when cutting sole and heel blanks from raw and semicured rubber. The die also requires clearance when multiple thicknesses are cut from rigid material which will not compress edgewise and the cut parts are retained in the die, as for example when cutting blanks from fiber boards for insoles, counters, heel pieces, also box toe materials or the like where from four to six blanks are cut at one time. The die also requires clearance when cutting multiple thicknesses of certain materials used in the manufacture of canvas and rubber footwear particularly fabrics which have been coated or impregnated with rubber or gum compositions and are of such nature that they do not readily yield, and the sticky nature of the material causes the edges of the cut parts to adhere or frictionally bind against the inner walls of the die.

The socalled bending bench was designed a number of years ago and same is in common use by die manufacturers. The bending bench was designed primarily to make clicking dies but its use has gradually extended to other somewhat heavier types. Dies made of the heavy Walker stock (Fig. 1) and dies requiring clearance as previously set forth, however, cannot be formed on the bending bench. Compared with hand forging processes, the bending bench process is much faster, and is very desirable from the standpoint of working conditions, speed, economy, and quality of work produced.

With these facts in mind, my present die section, and the method of forming dies therefrom were devised, producing a die which is superior from every standpoint, and furthermore one which can be produced for only a fraction of the cost of the prior hand-forged dies, permitting formation of the die on the bending bench, while providing in the finished die all the advantages hereinbefore mentioned with respect to clearance, and retaining the corrugated safe gripping outer surface.

A cross-section through my novel die stock C is shown in Fig. 3, the outer face 1 of which follows the general outline of the corrugated outer face A2 of the Walker stock A, (Fig. 1), except that the portion of the stock embraced by the lowermost ridge or corrugation in Fig. 1 is omitted, thereby making the lower portion of my section C comparatively slim, with a slightly inward taper.

In place of the straight inner walls A' and B' shown in the stocks A and B (Figs. 1 and 2), the inner wall 2 of my stock is made to conform generally with the contour of the outer wall 1, the inner wall being very nearly parallel therewith, resulting in a section of substantially uniform thickness which produces a better balanced section since same has no marked relatively thick or thin portions. This feature has a decided advantage in all heating operations, particularly when it is desired to harden the die throughout its entire mass.

In my novel section, at the lower end of the inner wall adjacent that portion which is to become the cutting edge, is an inwardly offset portion 3 running the entire length of the section. This offset portion 3 is commonly known as finish, and is in effect surplus material any portion of which may be removed, leaving in the case of a cutting die, an opening of the correct size and shape, so that when surplus stock is removed from the outer wall 1 of the die a cutting edge is formed which will "blank" out sections all of predetermined size and shape, all such blanks being exactly alike. This finish strip 3 may be of any desired thickness or width, to suit conditions and need not necessarily be of the form as shown in the Fig. 3. For example, in Fig. 4 a modification is shown which is entirely satisfactory, the "finish" strip 3a being a slight thickening of the inner wall of the strip and gradually fading into the main portion of the section. The dominant feature of my invention is the provision of the finish strip 3—3a which may comprise any portion of the section such as 3x (Fig. 4) which crosses or extends beyond the line t—u, as such lends itself to my method of manufacturing dies and provides clearance incorporated in the raw material itself as delivered from the rolling mill to the die maker.

In Fig. 4 the line t—u represents the general limits of the inside of the die section, and is approximately parallel to the vertical axis of the section. Line x—y represents the line up to which material is removed from the inside of the die, and thus defines the inside limits of the cutting edge. Line z—z denotes the angle or plane on which surplus material is removed from the outer face of the die to form the cutting edge. Line m—m indicates the original limits in the raw stock of the cutting edge portion; and thus the cross-hatched area included within the angle formed by the intersection of lines x—y and z—z on line m—m is the completed wedge or cutting edge.

In forming a die using my improved section, the stock is first bent on a bending bench, Fig. 9, which bends the stock in one plane only, i. e., a plane parallel with the axis of the die, and in such a way that the template used will not touch any portion of the inside wall except the finish strip 3—3a. In Fig. 9 the section C is shown as disposed on the table 10 between the movable head 11 and the fixed head 12 of the bench. The faces of the heads 11 and 12 are formed to correspond and conform with the respective faces of the stock C in order to hold the section C down squarely on the table 10 during the bending operation. This bending results in a die E shown in section in Fig. 6 in which the clearance was provided in the raw stock itself due to the finish strip 3—3a. In Fig. 6 the line h represents the inside limits of the cutting edge portion, while the line k represents the inside limits of the main body of the die, the difference denoting clearance. During bending, the stock C is kept at right angles to the template, and because there are no flares or tapers to contend with, the bending is easily accomplished with little effort and in comparatively short time. In the bending of any type of die stock it is desirable to keep the partly formed and completely formed die flat at all times. This is difficult to do with smooth-walled stock and all operators in the usual die forming methods frequently have to straighten-up the die with hammer blows. By forming the bending tools so as to conform with the curves and ridges both on the inside and outside walls of the stock, as shown in Fig. 9, the stock is held down firmly against, and at right angles to, the top of the bench at all times by the complementary bending tools 11—12 themselves.

After my die has been properly formed on the bending bench as at E, and the ends welded together as at w (Fig. 7) the usual template is placed on the edge of the finish strip 3—3a and a line scribed around the template. Material is then removed from the inside of the die E up to said line by any suitable means. Numerous trials with grinding wheels disclosed that it was not practical to provide sufficient power behind a wheel small enough to operate within the die E to any advantage, and that the time consumed in such grinding operation made the same impractical; also hand filing was obviously too slow and inaccurate. Numerous trials disclosed that surplus stock from strip 3—3a could be removed on a vertical type milling machine cutting on the side of the conventional type of end mill, but this required the services of a skilled operator, and filing had to be finally resorted to because of the typical wavy surface produced by side cutting on an end mill; in fact, the edge became saw toothed and was useless on a cutting die.

I found in practice that an effective, efficient, and practical means of removing surplus stock was by the use of a continuous filing machine indicated in Fig. 10. In this arrangement one end of the chain of files 13 is dropped through the inside of the die E on table 14 and then connected with the other end. The surplus stock can be filed from the inside of the finish strip 3—3a, as shown in Fig. 10, in from three to five minutes, and any person possessed of normal eye-sight can do a perfect job with no risk of spoilage. A reciprocating type of filing machine might be used but it is obviously less efficient than the endless file.

After machining the inside of the die to proper size and shape, the die E is completed in the usual manner by grinding, and polishing the outside portion to produce a cutting edge. In Fig. 11 the die E on the table 15 is shown as engaging the grinding wheel 16 which removes surplus material from the outer face of die E along the line z—z (Figs. 3 and 4), up to the cutting edge defined by the filing operation indicated in Fig. 10.

My novel die stock C thus has the clearance incorporated therein by the provision of finish strip 3—3a, and by forming the die on the bending bench, and removing the surplus stock with the filing machine as shown in Fig. 10, a superior die can be produced for approximately only half the cost of production by the present methods. My new section is practically uniform in thickness, and requires bending in only one plane, and can be properly formed by any workman of ordinary ability after a short period of practice, who can in a short time bend 20 dies or more per day, whereas it took years to learns the forging method, and six dies per day was ordinarily considered good production. Use of my novel die stock permits commercial production of the highly desirable close-edge dies which conform exactly with the template with respect to the size and style required, thereby obviating the necessity of producing blank dies now commonly used and designed to cut blanks large enough to cover more than one size or style and subsequently requiring the cut blank to be placed on a rounding machine and the various sizes or styles required rounded out of the blank.

In my die, the fact that the side walls are substantially straight up and down permits use of a generally thinner and lighter weight section, which however is sufficiently strong for the service intended, and results in a die which is extremely light in weight compared to the die now in use. Dies made of my new section weigh 60% less than standard dies for same size now in use, thereby saving the operator many hundreds of pounds per day of dead load work; and resulting in higher production. Moreover, the generally thinner section permits of a noticeably thinner wedge, supporting a keener cutting edge, so that cutting is accomplished with less pressure, and the work is consequently less severe on the cutting block. The thinner entering wedge of my new section permits of a much easier control of the common fault of cutting under or over-size, and of springing, because the thicker the section from which a die is made, the more obtuse the angle forming the cutting edge, as indicated by the angles of the cutting edges shown in Figs. 1, 2 and 3.

The outside ridges as well as the inside curves of my undulating die section form an effective reinforcement when bent around corners or curves of a die, and prevent the die from springing out of shape or becoming distorted in event they should receive a sidewise or glancing blow. Straight walled dies, having smooth parallel sides, will in fact spring and distort out of shape under such blows which of course renders them useless.

My invention provides a new and improved die stock section whereby dies may be made therefrom using standard well known and accepted machine shop practice and methods of manufacture instead of using the more costly and slower forging method.

While I have described a die made for sole cutting, the principle of the finish strip and advantages of manufacture and use are applicable to any and all forms of sharp-edged cutting dies for power or hand cutting, regardless of size or shape or dimensions of stock from which they are made, and is particularly desirable and advantageous to any die requiring clearance, where such clearance is now being obtained through heating and forging the walls.

I claim:

1. The method of making ring cutting dies having clearance which consists in providing a stock strip having a body portion and having a cutting edge portion one face of which is offset from the plane of the adjacent face of the body portion to provide material from which surplus stock may be removed; bending the strip in a plane parallel with the axis of the die so that the offset face is disposed on the inner wall of the die and substantially conforms with the desired template; removing surplus material from the offset face in a plane substantially parallel with the axis of the die to define the cutting edge; and subsequently removing surplus material from the other face of the strip to sharpen the cutting edge.

2. The method of making ring cutting dies having clearance, which consists in providing a strip of material of substantially uniform thickness throughout having a body portion and having a cutting edge portion one face of which is offset from the plane of the adjacent face of the body portion to provide material from which surplus stock may be removed; bending the strip in one plane only so that the offset face is disposed on the inner wall of the die and substantially conforms with the desired shape; uniting the ends of the strip; removing surplus material from the offset face in a plane substantially parallel with the bending plane to define the exact cutting edge of the die; and subsequently removing surplus material from the other face of the strip to sharpen the cutting edge.

3. The method of making ring cutting dies having clearance, which consists in providing a corrugated strip of material of substantially uniform thickness throughout having a body portion and having a cutting edge portion and a striking edge portion, said cutting edge portion having one face which is offset from the plane of the adjacent face of the body portion to provide material from which surplus stock may be removed; bending the strip while maintaining same parallel with the axis of the die so that the offset face is disposed on the inner wall of the die and substantially conforms with the desired template; uniting the ends of the strip; removing surplus material from the offset face in a plane substantially parallel with the axis of the die to define the exact cutting edge; and subsequently removing surplus material from the other face of the strip to sharpen the cutting edge.

4. Inherent clearance-providing die-stock, comprising a rolled strip of material of substantially uniform thickness throughout, said strip comprising a longitudinally corrugated body portion and a cutting-edge portion one face of said cutting-edge portion being continuously offset from the plane tangent to the crests of the corrugations on the adjacent face of the body portion to provide material from which surplus stock may be removed along the entire cutting-edge portion in a plane substantially parallel with and offset from said adjacent face of the body portion to thereby provide clearance.

CHARLES EARL MARTIN.